Oct. 30, 1951     T. BROWN     2,572,910
TRACTOR SEAT LEVELING MECHANISM
Filed Aug. 27, 1947     2 SHEETS—SHEET 1
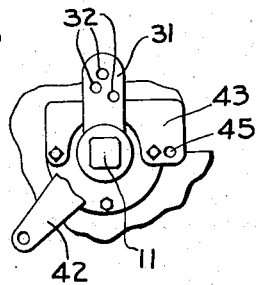
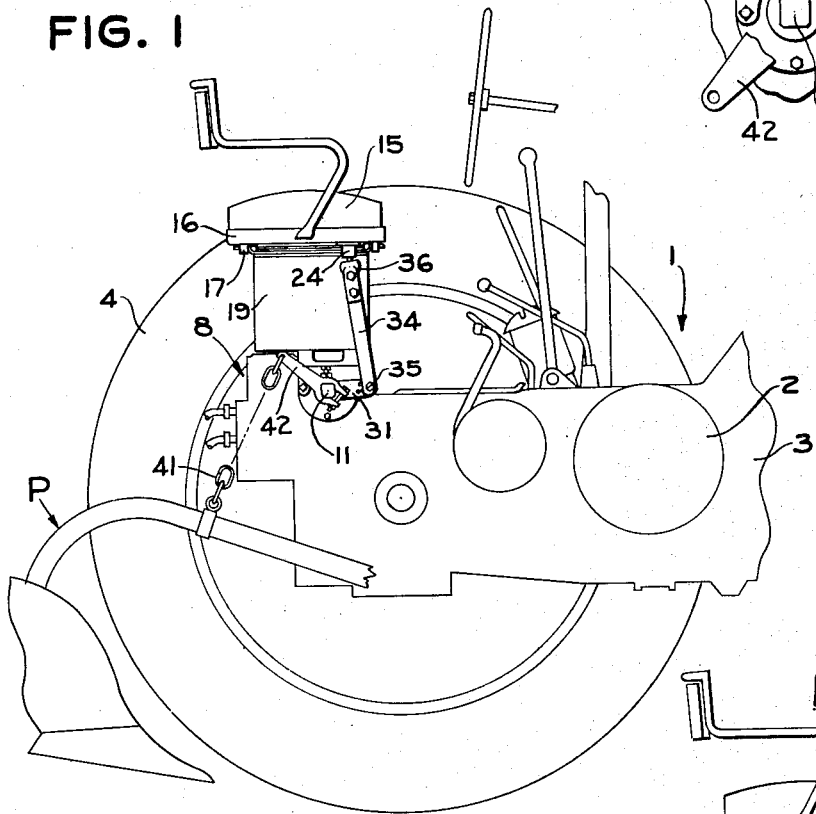
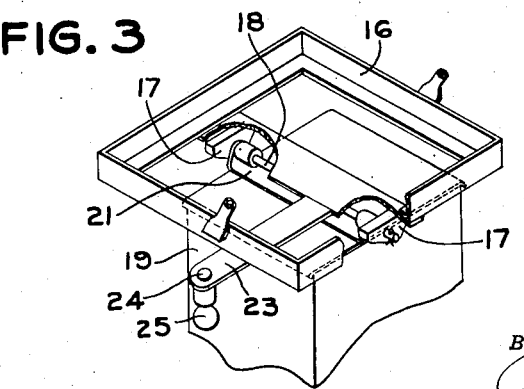
INVENTOR
THEOPHILUS BROWN
BY
ATTORNEYS Oct. 30, 1951     T. BROWN     2,572,910
TRACTOR SEAT LEVELING MECHANISM
Filed Aug. 27, 1947     2 SHEETS—SHEET 2
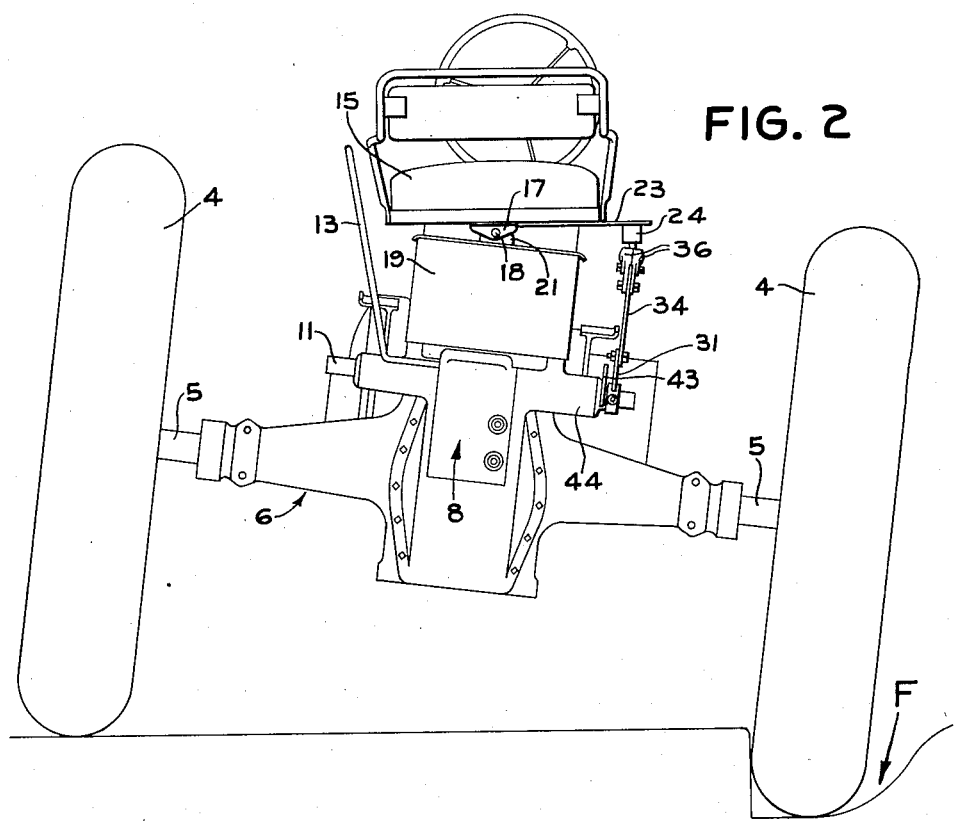
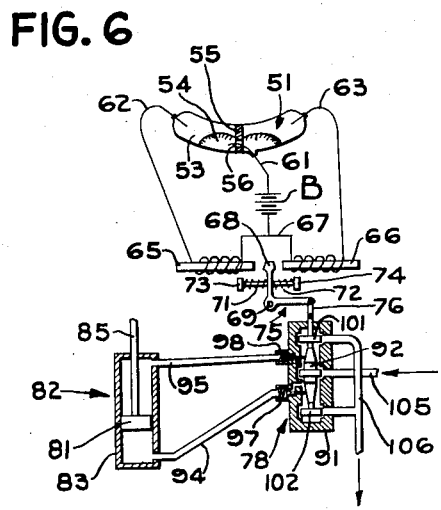
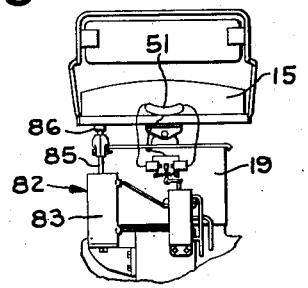
INVENTOR
THEOPHILUS BROWN
ATTORNEYS Patented Oct. 30, 1951

2,572,910

UNITED STATES PATENT OFFICE 2,572,910

TRACTOR SEAT LEVELING MECHANISM

Theophilus Brown, Moline, Ill., assignor to Deere & Company, Moline, Ill., a corporation of Illinois Application August 27, 1947, Serial No. 770,817

6 Claims. (Cl. 280—6)

The present invention relates generally to agricultural implements and more particularly to tractors or other agricultural machines which include an operator's station or support, usually in the form of a seat.

The object and general nature of the present invention is the provision of means for holding the operator's support in a generally horizontal position, thereby providing for the operator's comfort and safety, irrespective of changes in the position of the tractor or other machine on which the operator's support is mounted. More specifically, it is a feature of this invention to provide a laterally tiltable tractor seat and means for changing the position of the seat relative to the tractor so that when the tractor is operated in a tilted position, as in plowing during which one of the rear wheels of the tractor normally operates in a previously opened furrow, the tractor seat is moved into or held in a substantially horizontal position. In one form of the invention a connection is made between the laterally tiltable seat and an operating power actuated part of the tractor which raises and lowers the plow or other tool into and out of transport and working positions so that, as in the case of a plow, when the tool is lowered into an operating position, in which the tractor normally is operated in a laterally tilted position, the seat is automatically shifted into a position that is horizontal with respect to the ground surface. In another form of the invention automatic means is provided for maintaining the seat in a level position relative to the surface of the ground whenever, for any reason, the tractor is operated in a non-level position.

It is a further feature of this invention to provide means for locking the seat to the tractor in the event it is not desired to change the position thereof with the raising and lowering of the plow or other tools.

These and other objects and advantages of the present invention will be apparent to those skilled in the art after a consideration of the following detailed description, taken in conjunction with the accompanying drawings.

In the drawings:

Figure 1 is a fragmentary side view of a tractor in which the principles of the present invention have been incorporated.

Figure 2 is a rear view of the tractor shown in Figure 1, with the tractor shown in a tilted position, as when plowing.

Figure 3 is a fragmentary perspective view showing the details of the pivotal mounting of the seat on a part of the tractor.

Figure 4 is a fragmentary side view showing the seat locked in a relatively stationary position relative to the tractor.

Figure 5 is a fragmentary rear view showing a modified form of the present invention in which a gravity operated switch is mounted on the laterally tiltable seat and connected to suitable electrical and hydraulic controls with means for automatically shifting the position of the seat relative to the tractor so as to hold the seat in a substantially horizontal position irrespective of changes in the position of the tractor.

Figure 6 is a schematic view of the control mechanism shown in Figure 5.

Figure 7 is an enlarged detail of the seat tilting arm.

Referring now to the drawings, a farm tractor of more or less conventional construction is indicated in its entirety by the reference numeral 1 and comprises a power plant 2 carried by a framework 3 which is supported on steerable front wheels (not shown) and a pair of rear driving wheels 4, the latter being secured respectively to drive shafts 5 carried by the rear axle structure 6 of the tractor. The latter also includes a power lift unit 8 driven by the motor 2 of the tractor. The power lift unit 8 may be identical with or similar to the hydraulic power lift shown in the United States Patent 2,302,637, issued November 17, 1942, to Elmer McCormick et al., to which reference may be made if necessary. Briefly, such power lift unit includes a gear pump driven by the tractor motor and a hydraulic ram unit connected to operate a power lift apparatus under the control of suitable valve mechanism. The power lift unit 8 includes means for actuating a transverse rockshaft 11, and the valve mechanism includes a hand lever 12 accessible to the operator.

Disposed at the rear of the tractor, as shown in Figures 1–3, is a seat or platform, indicated by the reference numeral 15. According to the principles of the present invention the operator's seat or support 15 includes a generally rectangular frame 16 (Figure 3) pivotally mounted by means of oppositely arranged lugs 17 and a longitudinal pivot shaft 18 that is carried by a relatively stationary part of the tractor, such as the battery case 19, the latter being provided with a bracket 21 provided with apertured upturned ends to receive the pivot shaft 18. An arm 23 is fixed to the seat frame 16 and is provided with a stud 24 carrying a ball 25 at its outer end.

The power lift rockshaft 11 has an arm 31 fixed thereto, the outer end of the arm 31 being provided with a plurality of apertures 32, as best shown in Figure 7. A link 34 is connected at its lower end, as by a quick detachable pin 35, to the arm 31, as best shown in Figure 1, and at its upper end the link 34 is provided with socket members 36 which pivotally connect the upper end of the link 34 with the ball 25. In operation, as in plowing, one wheel of the tractor normally operates in the previously opened furrow F (Figure 2) so that the tractor when plowing is in a laterally tilted position, but when the plow is raised into a transport position the tractor normally is in a level position, the plow P (Figure 1) being raised and lowered by a connection 41 to an arm 42 fixed to the power lift shaft 11, either inside or outside the seat tilting arm 31, as desired. The latter arm is preferably arranged so that when in transport position, as shown in Figure 1, the arm 31 occupies a generally lower position, which acts through the link 34 to position the operator's seat or support 15 in a level position, but when the power lift rockshaft 11 is actuated to lower the plow into an operating position, in which the tractor is normally tilted laterally, as shown in Figure 2, the arm 31 is swung upwardly and exerts a thrust through the link 34 which tilts the seat 15 relative to the tractor so that, with the tractor tilted, the seat 15 is brought to or retained in a level position relative to the ground surface. Since the seat is in a level position, the operator's comfort is assured. When the end of the furrow is reached and the plow P lifted for transport across the headland to another furrow or to some other field, the seat 15 is automatically returned to a level position relative to the tractor without any attention on the part of the operator.

In order to provide for holding the seat 15 in a stationary position relative to the tractor so that the latter may be used for other purposes without having the seat 15 shifted whenever the power lift rockshaft 11 is actuated, I provide a stationary arm 43 (Figure 4) and fix the same in any suitable way to the tractor, or to the end of the power lift housing 44 (Figure 2). The outer end of the arm 43 is apertured, as at 45, so as to provide for the reception of the quick detachable pin 35 whereby the link 34 may be disconnected from the arm 31 and connected to the stationary arm 43 for the purpose of holding the seat 15 in a fixed position relative to the tractor, as shown in Figure 4.

A modified form of the present invention is shown in Figures 5 and 6 in which a gravity operated mercury switch 51 is fixed to the tractor seat. The switch 51 is of a type in which a globule of mercury 54 moves from one end of the other of a glass tube 53 in which the globule of mercury is disposed. A restricted barrier 55 having a small opening 56 therein is disposed within the glass tube 53 and prevents the globule of mercury 54 from shifting back and forth due to normal oscillations of the tractor during travel. A center electrical lead 61 leads to a battery B, and the opposite ends of the glass tube 53 carry electrical leads 62 and 63, respectively. The lead 62 is connected with a solenoid 65 and the lead 63 is connected to a solenoid 66, the solenoids 65 and 66 being connected to the battery B through connections 67. An armature 68 is disposed between the adjacently mounted cores of the solenoids 65 and 66 and is pivotally mounted, as at 69, on some part of the tractor. The armature 68 is normally centered by means of a pair of springs 71 and 72 which act between stationary abutments 73 and 74 and the armature 68. The latter is formed on or carried by a bell crank member 75 which is connected through a link 76 to operate a hydraulic valve unit 78 which, in turn, controls the position of the piston 81 of a ram unit 82, the cylinder 83 of which is mounted in any suitable position on the tractor. The piston 81 is connected through linkage 85 to a ball stud 86 fixed to the seat 15, as best shown in Figure 5. The hydraulic valve mechanism 78 per se may be of conventional construction and preferably includes a valve casing 91 in which a plunger 92 having tapered ends is slidably disposed and connected through the link 76 with the armature bell crank 75. Oil lines 94 and 95 lead from opposite ends of the cylinder 83 to the valve casing 91 through poppet valve controlled connections 97 and 98, each of the poppet valves having shanks cooperating with the tapered end portions of the plunger 92. The plunger 92 also includes cylindrical valve sections 101 and 102 arranged when the plunger 92 is moved in one direction or the other to direct the flow of oil entering the valve case 78 through a high pressure lead 105 from a hydraulic pump or the like to one or the other of the leads 94 and 95 extending to one end or the other of the seat controlling hydraulic ram unit 82. Oil discharged from the unit 82 is led to a sump or the like through a discharge connection 106.

The operation of the form of the invention shown in Figures 5 and 6 is substantially as follows. When the seat 15 occupies a normally horizontal position the globule of mercury 54 in the switch unit 51 occupies a position between the electrodes 62 and 63 and out of contact with either of them. However, should the seat 15 be shifted out of its level position the mercury 54 will contact one or the other of the electrodes 62 and 63 and energize one or the other of the solenoids 65 and 66 to shift the valve 92 and thus cause fluid under pressure to be directed into one end or the other of the unit 82, the movement of the piston 81 therein resulting from such actuation automatically returning the seat 15 toward a horizontal position, at which time the mercury globule 54 moves back into a central position, terminating the energization of the solenoid, whereby the valve 92 will be shifted into a neutral position locking the fluid in the cylinder 83 and thus holding the seat 15 positively in a horizontal position until it is again displaced.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a tractor having a transverse rockshaft actuable by power from the tractor, a seat, a seat mounting carried by the tractor and providing for lateral tilting of the seat about a generally longitudinal axis, an arm on said rockshaft, and a link pivotally connected with said arm and said seat for rocking the latter.

2. In a tractor having a power lift rockshaft and an operator's seat, means for tiltably supporting said seat, an arm connected with said rockshaft, a connection between said arm and said seat support, and means for adjusting said connection to vary the amount of movement of said seat relative to the corresponding movement of said power lift rockshaft.

3. The invention set forth in claim 2, further characterized by said connection including a link and said arm having a plurality of openings disposed at different distances from the axis of rocking movement of said shaft, to receive one end of said link in any one of a plurality of positions relative to said axis.

4. For use with a tractor having a power lift and an implement adapted to be connected with the tractor and connected to be raised and lowered by operation of said power lift, the improvement comprising a seat, a seat mounting carried by the tractor and providing for lateral tilting of the seat about a generally longitudinal axis, and means for connecting the seat with the power lift so that the seat is tilted laterally, relative to the tractor, whenever the power lift is actuated to lower said implement.

5. In a tractor having a transverse rockshaft actuable by power from the tractor, a seat, a seat mounting carried by the tractor and providing for lateral tilting of the seat about a generally longitudinal axis, an arm on said rockshaft, and means actuated by said arm and connected with said seat for rocking the latter by movement of said transverse rockshaft.

6. In a tractor having a power lift rockshaft and an operator's seat, means for tiltably supporting said seat, an arm connected with said rockshaft, a connection between said arm and said seat support, said connection being detachable from said arm, and a stationary member adapted to be fixedly connected to the tractor and receiving said connection for holding said seat in a given position relative to the tractor while accommodating movement of said rockshaft arm.

THEOPHILUS BROWN.

REFERENCES CITED

The following references are of record in the file of this patent:

UNITED STATES PATENTS

| Number | Name | Date |
|---|---|---|
| 705,731 | Ach | July 29, 1902 |
| 937,922 | Burd | Oct. 26, 1909 |
| 1,232,420 | Berger | July 3, 1917 |
| 1,542,733 | Schulze | June 16, 1925 |
| 2,293,328 | Coburn | Aug. 18, 1942 |